United States Patent [19]
Smith

[11] 3,960,190
[45] June 1, 1976

[54] METHOD AND APPARATUS FOR HARVESTING SHEARED TREES

[75] Inventor: John Gerald Smith, Woodstock, Canada

[73] Assignee: Eaton Yate Ltd., Canada

[22] Filed: June 4, 1975

[21] Appl. No.: 583,734

[52] U.S. Cl. .............................. 144/3 D; 144/2 Z; 144/309 AC
[51] Int. Cl.² ...................................... A01G 23/08
[58] Field of Search ................ 144/2 Z, 3 D, 34 R, 144/34 E, 309 AC

[56] References Cited
UNITED STATES PATENTS

| | | | |
|---|---|---|---|
| 3,461,928 | 8/1969 | Siiro | 144/3 D |
| 3,487,864 | 1/1970 | Larson et al. | 144/34 R X |
| 3,623,521 | 11/1971 | Sheilds | 144/2 Z |
| 3,643,711 | 2/1972 | Puna | 144/2 Z |
| 3,721,280 | 3/1973 | French | 144/2 Z |
| 3,731,719 | 5/1973 | Pierrot et al. | 144/2 Z X |
| 3,889,729 | 6/1975 | Pinomaki | 144/3 D |

Primary Examiner—Othell M. Simpson
Assistant Examiner—W. D. Bray
Attorney, Agent, or Firm—Teagno & Toddy

[57] ABSTRACT

An improved apparatus for processing sheared trees is provided, as well as the harvesting apparatus for use therein. The harvester is of the type having a gripping means disposed adjacent the forward end of the apparatus and a shear and delimber longitudinally movable relative to the boom. The shear and delimber are initially positioned adjacent each other and during the first rearward delimbing stroke, the delimber moves rearward relative to the shear. At the end of the delimbing stroke, the shear is activated to sever a first bolt, then a greater pressure is applied to the delimber blades so that they are able to grip the remaining trunk for the return stroke, during which the delimber moves forward relative to the shear. Thus, at the end of the return stroke the delimber and shear have returned to their initial positions and the delimbed portion of the remaining trunk extends a sufficient distance forwardly of the shear to be clamped by the gripping means. The pressure on the delimbing blades is reduced to the regular delimbing pressure, and the harvester is then in a position to perform a second delimbing stroke, followed by a second return stroke, and if necessary, a third set of strokes. Thus, it is possible with the method and harvester provided herein to quickly and efficiently delimb a tree trunk of any length with only one shear and delimber assembly.

11 Claims, 7 Drawing Figures

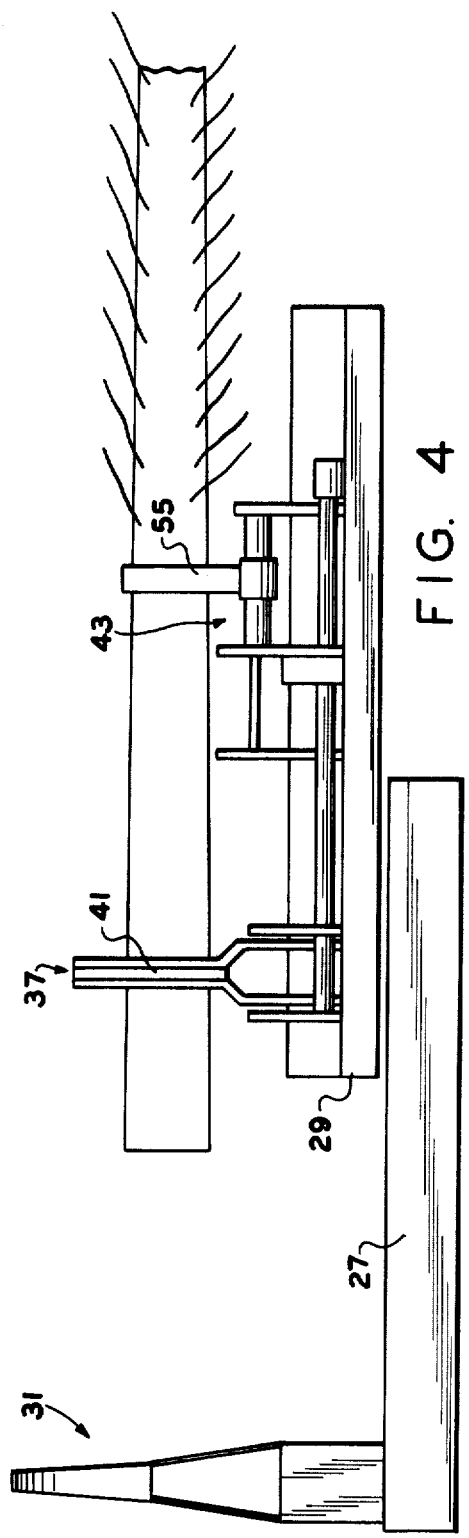
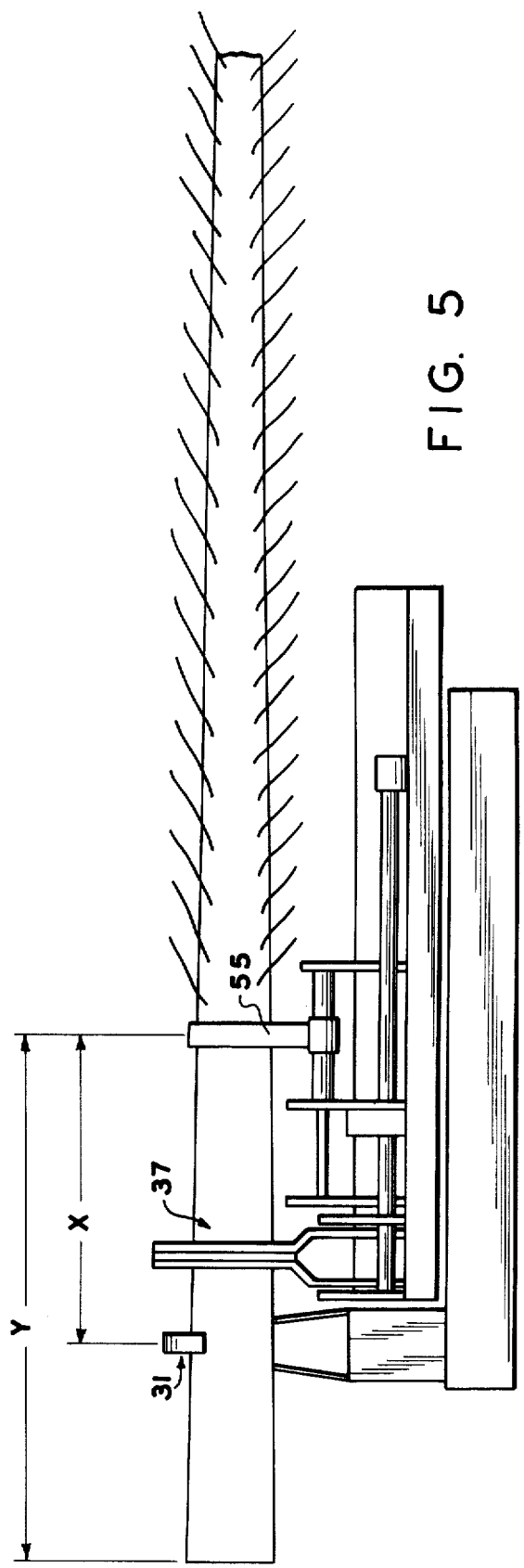

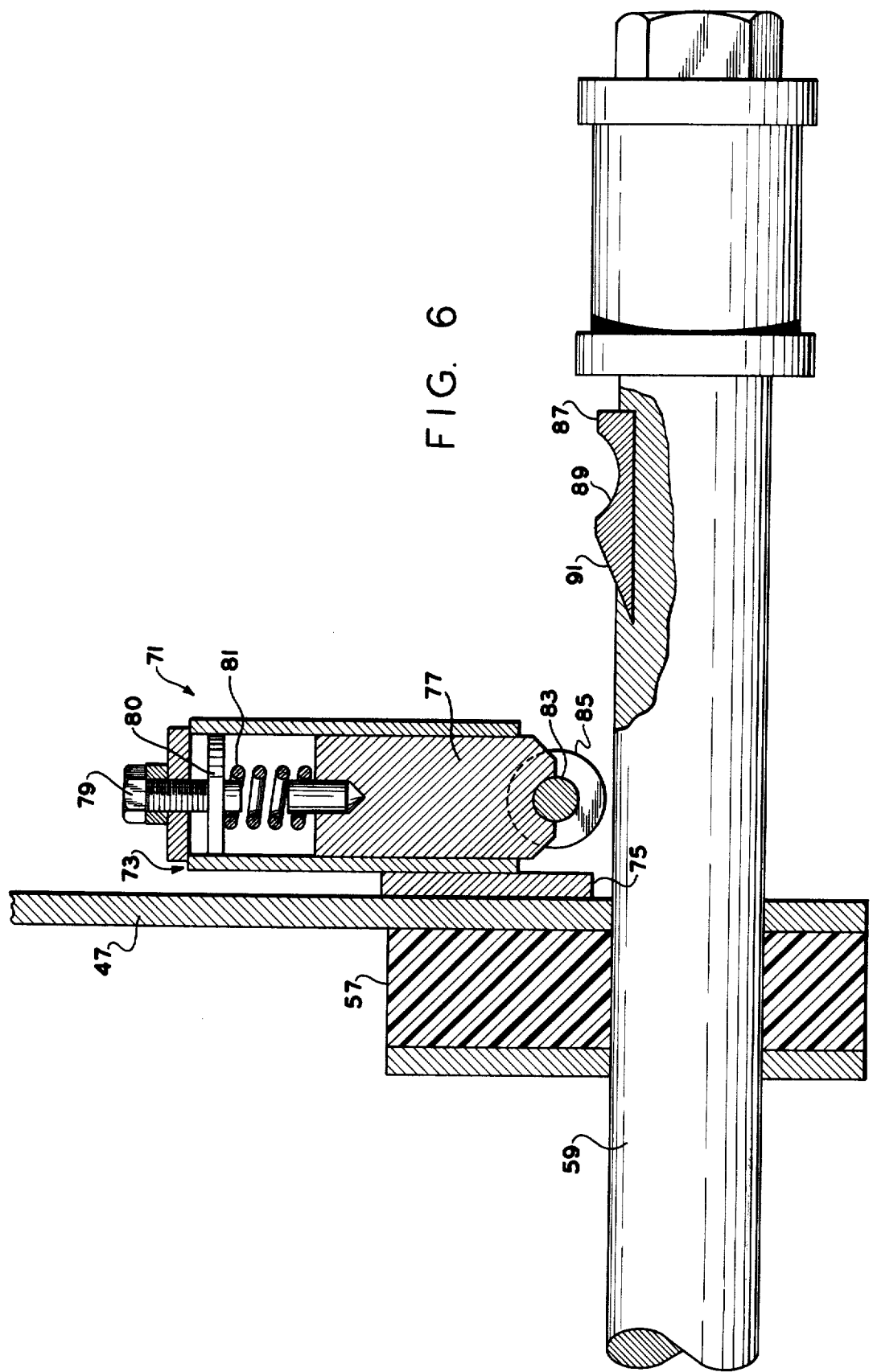

METHOD AND APPARATUS FOR HARVESTING SHEARED TREES

BACKGROUND OF THE DISCLOSURE

The present invention relates to an improved method and apparatus for processing sheared trees, and more particularly, to a method and apparatus capable of processing trees which are substantially longer than the travel of the apparatus.

A typical tree processing apparatus includes a carriage having a delimber head, the carriage being movable outwardly along a boom to delimb the trunk of the sheared tree. When the carriage and delimber head reaches an outermost position, a pair of topping blades are actuated to cut off or top the outer end portion of the tree trunk. The delimbed and topped tree trunk is then deposited in a bunk.

Examples of prior art methods and apparatus for delimbing and topping trees include those illustrated in U.S. Pat. No. 3,693,679 and Canadian Pat. No. 927,718. Typically, prior art processing methods and apparatus have placed a limitation on the height of the trees could be processed because of the limitation imposed on the delimbing stroke of the apparatus by the overall length of the apparatus. For example, a known prior art processing apparatus or harvester has a 32 ft. delimbing stroke. In addition, the return stroke of the delimbing head in prior art harvesters has represented "lost motion", i.e., a portion of the operating cycle which is wasted. Thus, the length limitation and the cycle time of the entire delimbing and topping operation have heretofore placed a limitation on the volume of trees which could be processed (delimbed and topped) within a given length of time.

A harvesting method and apparatus which overcomes the above-stated problems is illustrated and described in copending application Ser. No. 560,662, filed Mar. 20, 1975, in the name of Stanley C. Jasinski and Robert N. Windsor for a "Method of Processing Trees and Apparatus Used Therein". Althrough generally satisfactory in operation, the apparatus disclosed in the above-cited application requires two separate shear and delimber carriages, thus adding to the complexity and cost of the apparatus.

This device permits smaller machines to be used for processing of long trees whereas currently, in general, only huge, heavy and more costly machines have been developed for this purpose.

SUMMARY OF THE INVENTION

Accordingly, it is an object of the present invention to provide an improved method and apparatus for harvesting sheared trees capable of delimbing and cutting a plurality of log-length bolts from a tree trunk, wherein the tree trunk is substantially longer than the travel of the shear and delimber.

It is a related object of the present invention to provide a method and apparaus for processing sheared trees as stated above, but which requires only one shear and delimber assembly.

It is a specific object of the present invention to provide a tree harvester which, after a delimbing and return stroke of the shear and delimber, grips the butt end of the remaining trunk in preparation for a subsequent delimbing and return stroke.

It is an even more specific object of the present invention to achieve the above-stated object by providing a harvester in which the shear and delimber are relatively movable, both during the delimbing stroke and the return stroke.

These and other objects of the present invention, which will become apparent upon a reading of the following detailed description, are accomplished by the provision of an improved method and apparatus for processing a sheared tree of the type including a boom and a means for gripping a tree adjacent its butt end, the gripping means being disposed adjacent the forward end of the boom. A processing head including a delimbing means and a shearing means is associated with the boom and longitudinally movable relative thereto and the delimbing means is longitudinally movable relative to the shearing means. A first portion of the tree trunk is delimbed, the first portion being defined by the butt end and a first point along the trunk. During this delimbing stroke, the delimbing means moves rearward relative to the shearing means. The shearing means severs a first bolt defined by the butt end and a second point disposed between the first point and the butt end. The delimbing means then grips the remaining tree trunk, and the processing head and the tree trunk moves forward, and during this forward movement, the delimbing means moves forward relative to the shearing means such that the butt end of the remaining tree trunk is moved forward of the shearing means and is gripped by the gripping means. A second portion of the tree trunk is then delimbed by the delimbing means moving rearward along the tree trunk, as with the first delimbing stroke, and a second bolt is severed.

In accordance with another aspect of the present invention the harvester includes means for effecting rearward movement of the shear in response to rearward movement of the delimber relative to the boom, the means permitting a longitudinal separation no greater than a predetermined distance "Y" between the shear and the delimber. There is also means for effecting forward movement of the shear in response to forward movement of the delimber relative to the boom, the means reducing the longitudinal separation between the delimber and the gripping means to a predetermined distance "X", wherein Y is greater than X.

In accordance with another aspect of the present invention, the harvester includes a shear detent means which maintains the shearing means longitudinally fixed relative to the boom, adjacent the forward end thereof, when less than a predetermined longitudinal force is applied to the shearing means. There is also a means interconnecting the shearing means and the delimber means which limits axial separation therebetween and a delimber detent means operable to maintain the delimbing means longitudinally fixed relative to the interconnecting means when less than a second predetermined longitudinal force is applied to the delimbing means.

BRIEF DESCRIPTION OF THE DRAWINGS

FIGS. 2–5 are somewhat schematic illustrations of the processing method, during the various steps thereof.

FIG. 6 is a longitudinal view, partly in section, and on a larger scale, showing a portion of the apparatus for one particular embodiment of the invention.

DESCRIPTION OF THE PREFERRED EMBODIMENTS

Figure 1:
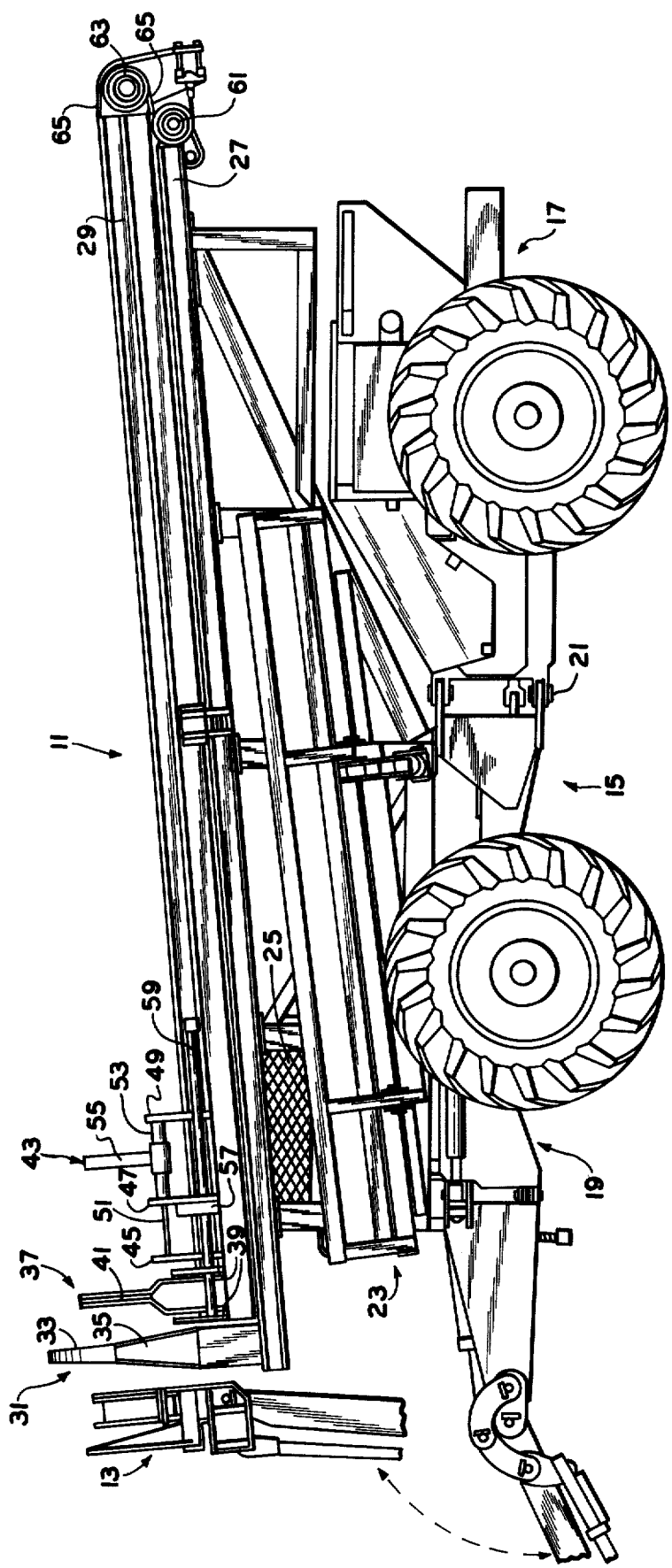
FIG. 1 is an elevational view of a tree harvester in accordance with the present invention, adapted for practicing the processing method of the present invention.

Referring now to the drawings, which are for the purpose of illustrating preferred embodiments of the present invention and not for limiting the same, FIG. 1 is an elevational view of a tree harvesting apparatus, generally designated 11, adapted for practicing the present invention. The harvesting apparatus 11 includes a felling assembly 13, which is shown fragmentarily in both its lower position, in which it is operable to sever a standing tree, and its raised position, in which the felling assembly 13 positions a tree trunk longitudinally on the apparatus 11 as will be described in greater detail subsequently. The felling assembly 13 may be of the type well known in the art, and forms no part of the present invention.

The harvesting apparatus 11 is preferably an articulated vehicle 15 having a trailing end portion 17 and a leading end portion 19, the end portions 17 and 19 being connected at a pivot connection 21. After a portion of the trunk is delimbed and a bolt severed, it is deposited in a bunk 23 which is mounted on one side of the vehicle 15, with an operator's cab 25 being mounted on the opposite side of the vehicle 15, and thus, partially hidden in FIG. 1.

The articulated vehicle 15 includes a lower, fixed boom 27 and an upper, sliding boom 29 which moves longitudinally relative to the fixed boom 27. This relative movement of the fixed boom 27 and sliding boom 29 may be accomplished by any one of the means well known in the art, such as a hydraulic cylinder and piston arrangement.

The preferred form of the present invention utilizes what may be referred to as the "forward clamp concept", and for this purpose a forward clamp 31 is fixedly attached at the forward end of the fixed boom 27, i.e., adjacent the felling assembly 13. It should be understood that after the felling assembly 13 is utilized to shear the tree trunk and position it on the harvester, it may be used as the clamping means during the initial portion of the harvesting cycle, with the forward clamp 31 being used subsequently. The clamp 31 includes an upper, clamping portion 33 adapted to grip the tree trunk adjacent its butt end with sufficient clamping force to prevent longitudinal movement of the trunk during delimbing and shearing operations. Forward clamp 31 also includes a slanted portion 35 (i.e., slanted relative to the plane of FIG. 1), which causes the severed bolt to roll into the bunk 23, when the clamp 31 is opened.

Figure 2:
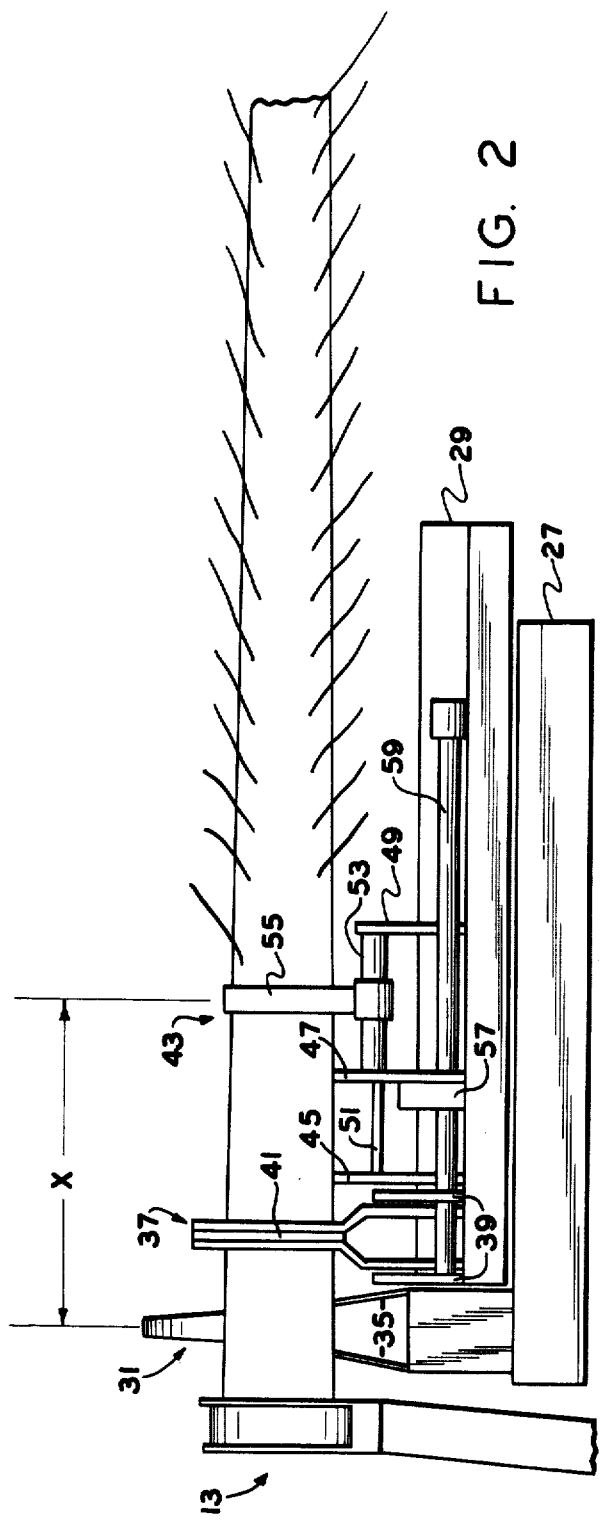

Referring still to FIG. 1, but in conjunction with the enlarged, schematic view of FIG. 2, there is shown a processing head including a bucking shear 37 and a delimber assembly 43. The bucking shear 37 includes front and rear support brackets 39 and a set of shear blades 41 positioned to cut on a plane perpendicular to the plane of the drawing figures. The specific details of the bucking shear 37 form no part of the present invention and the shear may be very similar to that disclosed in U.S. patent application Ser. No. 449,044, filed Mar. 7, 1974 by Robert N. Windsor for a "Tree Harvesting Apparatus", which is incorporated herein by reference.

Disposed rearward of the bucking shear 37 is the delimber assembly 43 including transverse support brackets 45, 47 and 49 as well as a longitudinal support member 51 extending between the support brackets 45 and 47. Extending between the support brackets 47 and 49 is a pair of support rods 53 (only one is visible in each of the figures), on which is mounted a set of delimbing blades 55, adapted to move on a plane perpendicular to the plane of the figures. As with the bucking shear 37, the specific details of the delimber assembly 43, except as subsequently noted, form no part of the invention and the delimber itself may be made in accordance with the teachings of the above-referenced application Ser. No. 449,044.

Attached to the forward face of support bracket 47 is a pair of bearing blocks 57 (only one which is visible in the figures), which are preferably made of a phenolic material. A pair of connecting rods 59 are fixedly attached to the support brackets 39 of the bucking shear 37 and pass through, and are supported by, the phenolic bearing blocks 57, such that the bucking shear 37 and delimber assembly 43 are relatively movable longitudinally, in addition to each being slidable relative to the sliding boom 29.

Referring again to FIG. 1, the harvester preferably includes a pulley and rope arrangement of the type well known in the art, including pulley members 61 and 63 and a rope (or cable) 65, partially shown in FIG. 1, wrapped around the pulley members 61 and 63. The opposite end of the rope 65 is connected to the delimber assembly 43 so that rearward movement of the sliding boom 29 relative to the fixed boom 27 results in rearward movement of the delimber assembly 43 relative to the sliding boom 29. The harvester also includes a similar pulleys and rope arrangement (hidden from view in FIG. 1 by the booms 27 and 29), so that on the return stroke, forward movement of sliding boom 29 relative to fixed boom 27 causes forward movement of the delimber assembly 43 relative to the sliding boom 29. It will be understood by those skilled in the art that, within the scope of the present invention, the forward end of the rope 65 may be connected to the bucking shear 37 with the movement of the delimber assembly 43 being controlled relative thereto.

OPERATION

Referring now to the schematic illustration of FIGS. 2–5, there is shown in FIG. 2 a severed tree trunk being gripped at its butt end by the felling assembly 13, which positions the tree trunk between the opposing shear blades 41 and the opposing delimber blades 55. The distance from the felling assembly 13 to the delimber blades 55 is such that there will not normally be any limbs forward of the delimber blades 55. If there are, however, they may be removed by the operator, utilizing the felling assembly 13 before shearing and positioning the tree trunk, so that all of the remaining limbs are accessible to the delimber blades 55. In the position shown in FIG. 2, the sliding boom 29 is in its forwardmost position, as are the bucking shear 37 and delimber assembly 43. In this initial or forwardmost position at the beginning of the cycle, the longitudinal separation between the forward clamp 31 and the delimber blades 55 is illustrated as being X, the importance of which will be described subsequently. It should be noted that, for ease of illustration, the relative dimensions (especially longitudinal) of the various elements are not the same as in FIG. 1, which is more representative of the preferred relative dimensions of the harvester.

Figure 3:
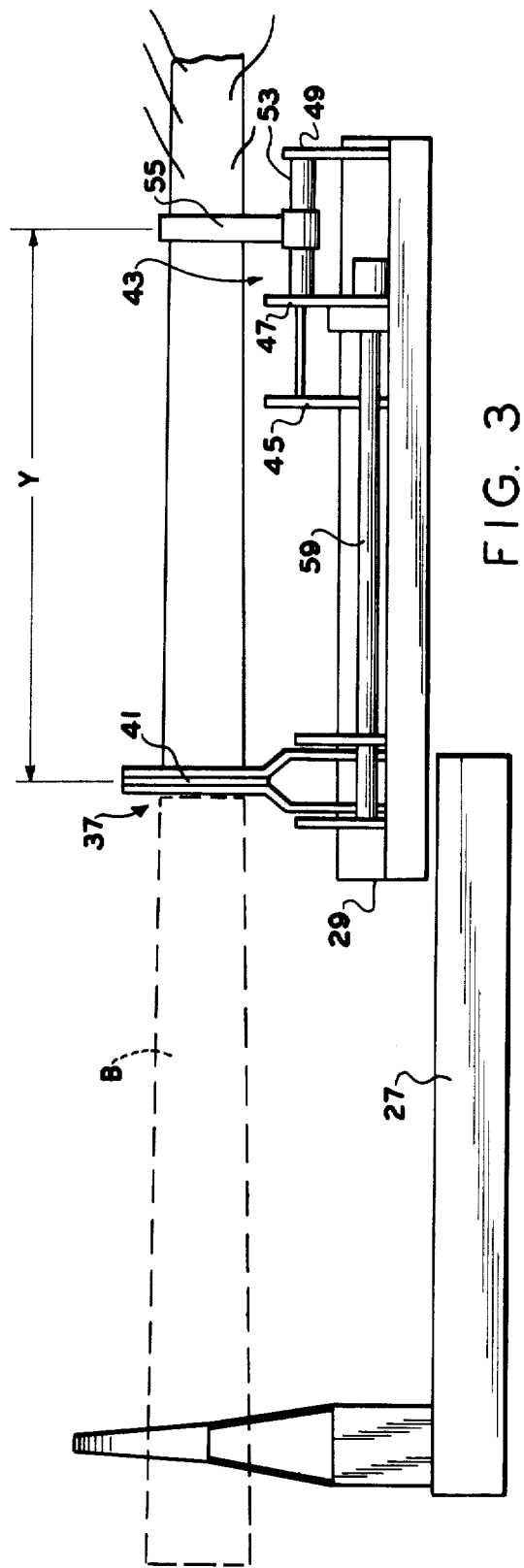

In the manner described previously, the sliding boom 29 is moved rearward relative to the fixed boom 27, causing the delimber assembly 43 to slide rearward relative to the sliding boom 29, until it reaches the position shown in FIG. 3. This initial movement (between the positions of FIG. 2 and FIG. 3) is the "delimbing stroke", during which just sufficient actuation pressure is maintained on the delimber blades 55 to cause them to remove all of the limbs engaged by the blades 55 during the rearward movement. As the delimber assembly 43 is being pulled rearward by the rope 65, the delimber assembly 43 is also moving rearward relative to the connecting rods 59, and it will be appreciated that when the delimber assembly 43, and more specifically the support bracket 47 reaches the end of the rods 59, the force being exerted on the delimber assembly by the rope 65 will in turn be exerted on the bucking shear 37 by means of the rods 59, thus pulling the shear 37 rearward relative to the boom 29.

At the end of the delimbing stroke, in the position shown in FIG. 3, the longitudinal separation between the shear blades 41 and the delimber blades 55 has been increased from a distance less than X (see FIG. 2) to a distance Y. At this point, the shear blades 41 are actuated, thus severing a first bolt B, designated by the dotted line, which is permitted to roll down the slanted portion 35 of the forward clamp 31 and into the bunk 23.

After the bolt B is severed, the sliding boom 29 begins its return stroke, as is illustrated in FIG. 4. During the return stroke, the delimber assembly 43 moves forward relative to the boom 29, and because clamping pressure has now been applied to the delimber blades 55, the remaining tree trunk moves forward with the delimber assembly 43. As the delimber assembly 43 moves forward relative to the boom 29, it also moves forward relative to the connecting rods 59, thus decreasing the longitudinal separation between the delimber blades 55 and the bucking shear 37. As a result, the butt end of the remaining tree trunk is moved between the shear blades 41 and forward relative thereto.

At the end of the return stroke, as is shown in FIG. 5, the delimber blades 55 are again separated longitudinally from the forward clamp 31 by a distance X, and it may now be appreciated that in order to practice the present invention, the distance Y (from the butt end to the clamping delimber blades 55) must be at least equal to the distance X, so that the butt end of the remaining tree trunk will project forwardly a sufficient distance to permit the trunk to be gripped by the forward clamp 31, in preparation for a second delimbing stroke, the severing of a second bolt, and a second return stroke. At the end of such a second return stroke, the harvester will again be in the position illustrated by FIG. 5, prepared for any subsequent delimbing and return strokes that may be necessary in order to use as much of the tree trunk as is commercially feasible. Although most of the operating cycle of the harvester is preferably made automatic, it should be appreciated that the last delimbing and return stroke may be controlled manually, to delimb and sever only as much of the remaining trunk as is desired, while discarding the remaining tree top.

Although the preferred embodiment of the present invention has been described in terms of specific means for interconnecting the bucking shear and the delimber assembly, and for controlling the longitudinal separation therebetween, it should be clearly understood that within the scope of the invention, many other specific structural arrangements could be utilized which permit increasing longitudinal separation of a bucking shear and delimber blades during the delimbing stroke, up to a predetermined limit, and permit a decrease in the longitudinal separation, down to a predetermined minimum, during the return stroke.

In another preferred form of the invention, rather than permitting the delimber assembly 43 to be freely movable relative to the connecting rods 59 and the bucking shear 37 to be freely movable relative to the sliding boom 29, the delimber and shear have their positions fixed during certain portions of the operating cycle. In this embodiment, the different elements of the harvester are positioned as shown in FIG. 2 at the beginning of the operating cycle, and the initial portion of the delimbing stroke is the same as that previously described.

Referring now to FIG. 6, there is shown a delimber detent, generally designated 71. The delimber detent 71 is shown mounted on the rearward face of support bracket 47 and includes a detent housing 73, rigidly held by means of a mounting plate 75, which is preferably bolted to the support bracket 47. Within the detent housing 73 is a bearing retainer 77 which moves vertically up and down, and is biased downwardly by a spring 81. A threaded member 79 is used to adjust the vertical position of a spring seat member 80. Held in place adjacent the bottom of bearing retainer 77 is a bearing shaft 83 on which is rotatably mounted a detent bearing 85. As may be seen at the cutaway portion of the connection rods 59, a detent seat 87 is seated within a recess formed in the rods 59. The detent seat 87 defines an arcuate seat surface 89 and an inclined surface 91.

Figure 7:
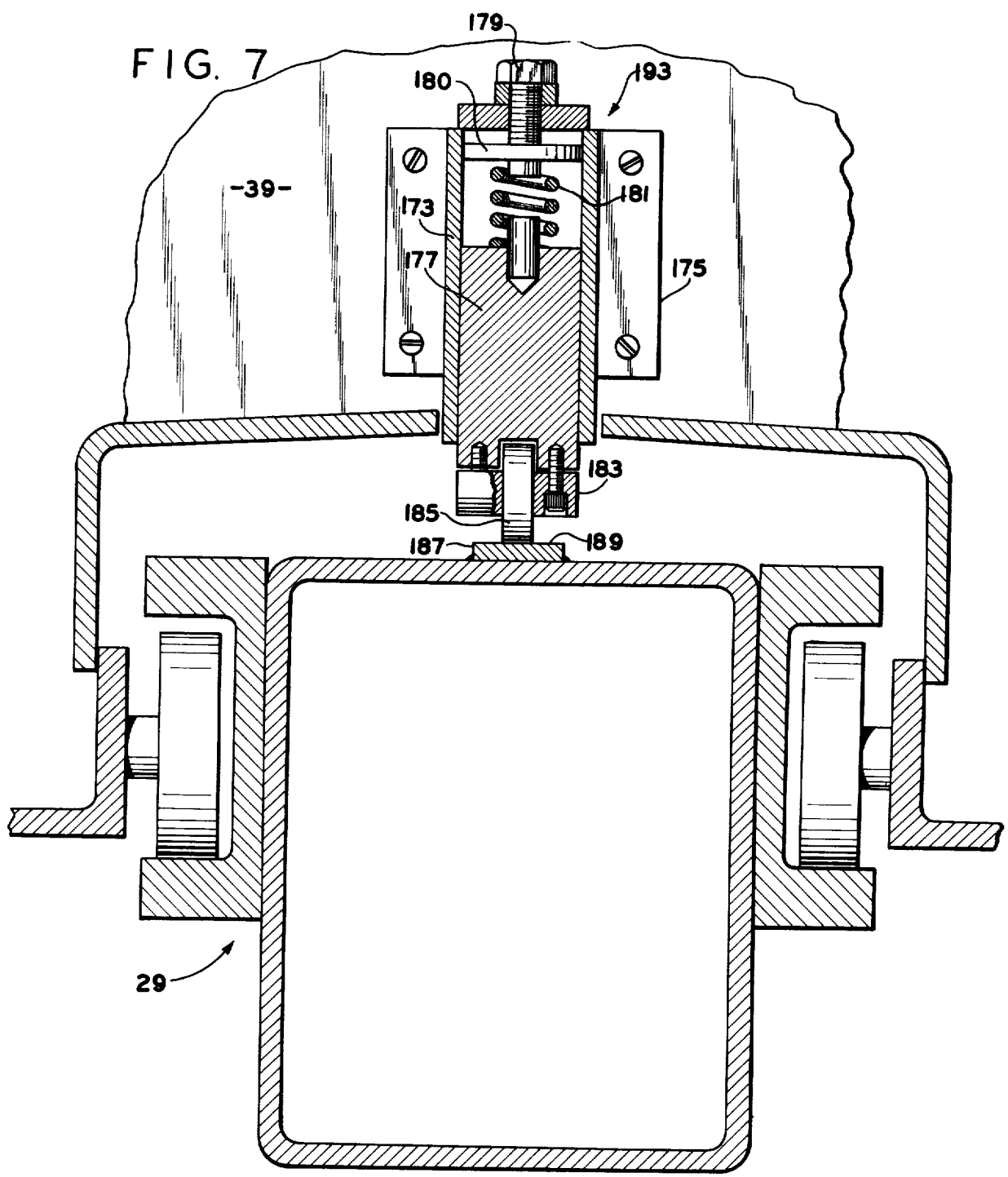
FIG. 7 is a transverse section view, on the same scale as FIG. 6, showing another portion of the apparatus for use in the one particular embodiment of the invention.

Referring now to FIG. 7, which is a transverse secton through the sliding boom 29 looking toward the front of the harvester, there is shown a shear detent assembly 93 taken on a section perpedicular to that of FIG. 6. It will be noted that the shear detent assembly 93 is substantially identical to the delimber detent assembly 71. In FIG. 7, like elements are referred to by like numerals, plus 100.

At the beginning of the processing method, with the harvester in the position represented by FIG. 2, the shear detent assembly 93 maintains the bucking shear 37 fixed relative to the sliding boom 29 until the delimber assembly 43 reaches the end of the connecting rods 59. This is illustrated in FIG. 7 with the detent bearing 185 being in engagement with the seat surface 189 of the detent seat 187. As the delimber assembly 43 reaches the end of the connecting rods 59, the detent bearing 85 of the delimber detent assembly 71 engages the seat surface 89 of the detent seat 87, fixing the delimber assembly 43 relative to the rods 59. At this point, the longitudinal pulling force exerted by the rope 65 on the delimber assembly 43 is, in turn, exerted by the rods 59 on the bucking shear 37, the force being sufficient to compress the spring 181 of the shear detent assembly 93, causing the detent bearing 185 to become disengaged from the seat surface 189 and roll down inclined surface 191 (not shown), permitting the bucking shear 37 to begin moving rearward relative to the sliding boom 29.

The delimber detent assembly 71 maintains the delimber assembly 43 fixed relative to the connecting rods 59, while the bucking shear 37 is movable relative to the sliding boom 29 during the remainder of the delimbing stroke, during the shearing of the bolt B and during most of the return stroke, until the forward movement of the delimber assembly 43 relative to the sliding boom 29 moves the bucking shear 37 to a position where the detent bearing 185 again engages the seat surface 189. When this occurs, the continuing force exerted on the delimber assembly 43 by the forward rope (not shown) is sufficient to cause the detent bearing 85 to become disengaged from its seat surface 89, in opposition to the biasing force of spring 81, permitting the delimber assembly 43 to move forward relative to the connecting rods 59, with the forward movement continuing until the harvester is in the position represented by FIG. 5. If subsequent delimbing and return strokes are required to fully process the tree trunk, the operation of the delimber detent 71 and the shear detent 93 will be the same in such subsequent strokes as in the inital stroke described above.

Thus, with the use of the delimber detent 71 and the shear detent 93 in this preferred form of the invention, at all times during the operating cycle, either the delimber assembly 43 is fixed relative to the connecting rods 59 or the bucking shear 37 is fixed relative to the sliding boom 29. It will be understood by those skilled in the art that although a specific structure of detent assembly has been illustrated and described, it is within the scope of the invention to utilize any form of detent means which is capable of accomplishing the above-described fixed relationships, while permitting disengagement of the respective elements upon the exertion of a predetermined longitudinal force on one of the engaged elements.

The invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I claim:

1. A method of processing a sheared tree utilizing a processing apparatus including a gripping means adjacent the forward end of the apparatus, delimber blades and a shear, the method comprising:
    a. gripping the trunk of the tree adjacent its butt end to maintain the tree trunk longitudinally fixed relative to the apparatus;
    b. positioning the delimber blades and the shear at a starting position with the delimber blades at a distance X rearward of the gripping means, the shear being disposed adjacent the delimber blades and between the gripping means and the delimber blades;
    c. moving the shear and the delimber blades rearward a predetermined distance to delimb a portion of the tree trunk;
    d. moving the delimber blades a distance Y rearward of the shear, the distance Y being at least equal to the distance X;
    e. actuating the shear to sever a bolt;
    f. releasing the grip on the bolt adjacent its butt end;
    g. gripping the tree trunk with the delimber blades, and at generally the same time, opening the shear;
    h. moving the shear and the delimber blades, gripping the tree trunk, forward to said starting position, the delimber blades moving forward relative to the shear.

2. A method of processing a sheared tree as defined in claim 1 including the additional steps of gripping the tree trunk forward of the shear and repeating steps (c) through (f) of claim 1.

3. A method of processing a sheared tree comprising:
    a. gripping the trunk of the tree adjacent its butt end;
    b. delimbing a first portion of the tree trunk with a delimbing means, said first portion being defined by said butt end and a first point along the trunk of the tree;
    c. actuating a shear to sever a first bolt defined by said butt end and a second point disposed between said first point and said butt end, a distance Y from said first point;
    d. releasing the grip on said first bolt adjacent its butt end;
    e. maintaining the remaining tree trunk and the delimbing means relatively fixed;
    f. moving the delimbing means and the tree trunk toward the shear a distance X, wherein Y is at least equal to X;
    g. gripping the tree trunk adjacent its second butt end;
    h. delimbing a second portion of the tree trunk with the delimbing means, said second portion being defined by said second butt end and a third point along the trunk of the tree;
    j. actuating the shear to sever a second bolt defined by said second butt end and a fourth point disposed between said third point and said second butt end, a distance Y from said third point; and
    k. releasing the grip on said second bolt adjacent its second butt end.

4. Apparatus for processing a sheared tree trunk comprising:
    a. a first boom member oriented generally longitudinally of said apparatus;
    b. means for gripping the tree adjacent its butt end, operable to position the sheared tree lengthwise of said first boom member, said gripping means being disposed adjacent the forward end of said apparatus;
    c. a second boom member longitudinally movable relative to said first boom member;
    d. means for effecting said relative movement of said first and second boom members;
    e. shearing means disposed adjacent the forward end of said second boom and longitudinally movable relative thereto;
    f. delimbing means associated with said second boom member and longitudinally movable relative to both said second boom member and said shearing means;
    g. means for effecting movement of said delimbing means rearward relative to said second boom member in response to rearward movement of said second boom member relative to said first boom member;
    h. means for effecting movement of said delimbing means forward relative to said second boom member in response to forward movement of said second boom member relative to said first boom member; and j. means interconnecting said shearing means and said delimbing means to permit longitudinal movement of said delimbing means away from said shearing means, said interconnecting means including means for limiting the longitudinal separation of said delimbing means and said shearing means to a predetermined distance Y.

5. Apparatus as defined in claim 4 including shear detent means operable to maintain said shearing means longitudinally fixed relative to said second boom member adjacent the forward end thereof when a longitudinal force of less than a first predetermined value is applied to said shearing means.

6. Apparatus as defined in claim 4 including delimber detent means operable to maintain said delimbing means longitudinally fixed relative to said interconnecting means when a longitudinal force of less than a second predetermined value is applied to said delimbing means.

7. Apparatus as defined in claim 4 wherein said delimbing means comprises a plurality of blades movable from an open condition spaced apart from the tree trunk to a closed condition with said blades in delimbing relationship adjacent the tree trunk.

8. Apparatus as defined in claim 7 wherein said blades are movable to a gripping condition, operable to prevent relative longitudinal movement between the tree trunk and said blades.

9. Apparatus as defined in claim 4 wherein aid interconnecting means causes said shearing means to move rearward relative to said second boom member in response to movement of said delimbing means rearward relative to said second boom member when said delimbing means is separated from said shearing means by said predetermined distance Y.

10. Apparatus for processing a sheared tree comprising:
   a. boom means normally oriented generally longitudinally of said apparatus;
   b. means for gripping the tree adjacent its butt end, operable to position the sheared tree lengthwise of said boom means, said gripping means being disposed adjacent the forward end of said apparatus;
   c. shearing means associated with said boom means and longitudinally movable relative thereto;
   d. delimbing means associated with said boom means and longitudinally movable relative to both of said boom means and said shearing means;
   e. means for effecting movement of said delimbing means rearward relative to said boom means in response to rearward movement of said boom means;
   f. means for effecting movement of said delimbing means forward relative to said boom means in response to forward movement of said boom means;
   g. means for effecting rearward movement of said shearing means in response to rearward movement of said delimbing means relative to said boom means, said means permitting a longitudinal separation no greater than a predetermined distance Y between said shearing means and said delimbing means; and
   h. means for effecting forward movement of said shearing means in response to forward movement of the delimbing means relative to said boom means, said means being operable to reduce the longitudinal separation between said delimbing means and said gripping means to a predetermined minimum distance X, wherein Y is greater than X.

11. Apparatus for processing a sheared tree comprising:
   a. boom means normally oriented generally longitudinally of said apparatus;
   b. means for gripping the tree adjacent its butt end, operable to position the sheared tree lengthwise of said boom means, said gripping means being disposed adjacent the forward end of said apparatus;
   c. shearing means associated with said boom means and longitudinally movable relative thereto;
   d. delimbing means associated with said boom means and longitudinally movable relative to both of said boom means and said shearing means;
   e. means for effecting movement of said delimbing means rearward relative to said boom means;
   f. means for effective movement of said delimbing means forward relative to said boom means;
   g. means for effecting rearward movement of said shearing means in response to rearward movement of said delimbing means relative to said boom means, said means permitting a longitudinal separation no greater than a predetermined distance Y between said shearing means and said delimbing means; and
   h. means for effecting forward movement of said shearing means in response to forward movement of the delimbing means relative to said boom means, said means being operable to reduce the longitudinal separation between said delimbing means and said gripping means to a predetermined minimum distance X, wherein Y is greater than X.

* * * * *